Figure 1:
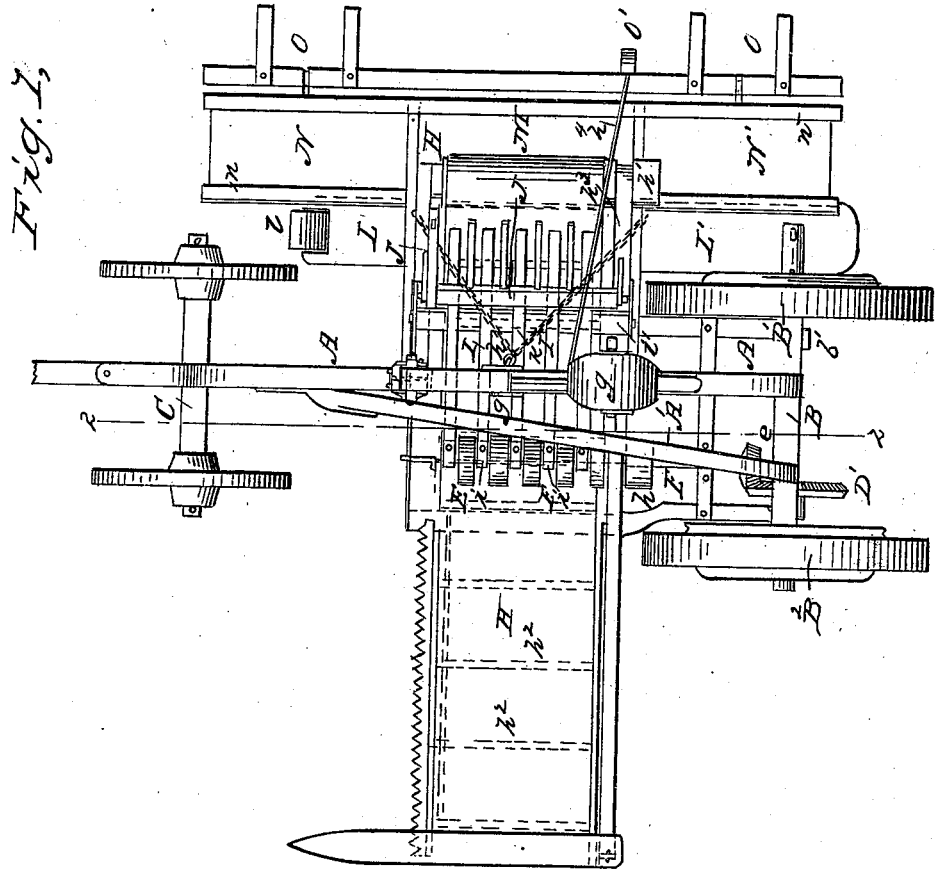

E. EMMERT.
Harvester.

No. 92,435.

2 Sheets—Sheet 1.

Patented July 13, 1869.

Witnesses:
Jos A Peyton
John J Chew

Inventor
Ezra Emmert
by his Atty
Wm D Baldwin

2 Sheets—Sheet 2.

E. EMMERT.
Harvester.

No. 92,435. Patented July 13, 1869.

Witnesses:

Inventor
Ezra Emmert
by his atty
Wm. D. Baldwin

UNITED STATES PATENT OFFICE.

EZRA EMMERT, OF FRANKLIN GROVE, ILLINOIS.

IMPROVEMENT IN HARVESTERS.

Specification forming part of Letters Patent No. 92,435, dated July 13, 1869.

*To all whom it may concern:*

Be it known that I, EZRA EMMERT, of Franklin Grove, in the county of Lee and State of Illinois, have invented certain new and useful Improvements in Harvesters, of which the following is a full, clear, and exact description.

This invention relates to that class of harvesters in which the grain is automatically conveyed to a position where it can be bound by persons riding on the machine. Parts of the invention, however, may be used in other harvesters.

The first part of my invention relates to the endless apron which conveys the grain to the binders; and the improvement consists in a novel method of constructing the endless apron, upon which the grain falls when first cut, of flexible material, stiffened transversely by metal strips bent up into flanges or hooks at their front ends only to catch and carry forward the butts of the grain which are apt to lag behind the heads.

The next part of my invention relates to devices for holding the grain while being elevated; and the improvement consists, second, in a novel method of combining with an elevating-apron an elastic grating flexibly connected at its lower end with the axis of the roller, under which the belt passes and oscillating on a central pivot. Each bar of the grating can thus yield independently of the others, and the whole grating can yield at either end, if required. The grain is thus securely held and its friction diminished, while the workman can at all times see the operation and remove any obstruction to the upward traverse of the grain.

The object of the next part of my invention is to intermit the supply of grain to the binding-receptacle of a harvester without stopping the carrying mechanism; and my improvement consists, third, in a novel method of combining with a continuously-moving carrier an oscillating stop-rake, which arrests the discharge of the grain when required.

Fourth. The improvement further consists in a novel method of combining a continuously-moving carrier with an elastic grating to hold the grain to the carrier, and with an oscillating stop-rake entering the spaces of the grating to cut off the supply of grain to the binding-receptacle.

Fifth. The improvement further consists in a novel method of combining a stop-rake oscillating at right angles to the carrier with automatic devices, for throwing the rake into and out of play.

Sixth. The next part of the invention relates to the binders. Its object is to enable the binders to face the stubble when working, in order that they may, when working, more readily throw the bundle either into the dumping-tray or on the ground out of the path of the team in the succeeding tour; and the improvement consists in a novel method of so locating binders' stands, both in front and rear of an elevating discharging device, that the binders may work facing the stubble.

Seventh. The invention further consists in a novel method of combining with a discharging device binders' stands, so located both in front and rear of a discharging device and in front of the driving-wheels, that the binders may work facing the stubble.

Eighth. The invention further consists in a novel method of combining, in a harvester, an elevated frame and a discharging device, suspended below the frame, with binders' stands located on each side of the discharging device and below the frame.

Ninth. The invention further consists in a novel method of combining a supporting-roller with a binder's foot-board, flexibly suspended from the main frame, to prevent jolting the binder from his place in case of encountering a sudden rise in the ground.

The next part of the invention relates to means for supplying the binders with bands, with which to tie the grain; and the improvement consists, tenth, in a novel method of combining, with the binder's stand, pockets to contain bands, or straw of a length proper to form bands, which is a great convenience in grain of varying height.

The next part of my invention relates to devices for automatically placing the grain before the binders; and the improvement consists, eleventh, in a novel method of combining binders' stands with a reciprocating conveyer, which deposits the grain before them. Twelfth, in a novel method of combining an apparatus discharging the grain laterally to the path of the machine, with a conveyer reciprocating transversely to the line of discharge; thirteenth, in a novel method of combining a carrier with binders' stands located in front and rear thereof, and with a receptacle located on the stubble side of the binders' stands, which delivers a gavel to each binder in succession; fourteenth, in a novel method of combining a binder's stand with a reciprocating-receptacle, in which the grain is bound; fifteenth, in a novel method of locating a reciprocating receptacle directly over the pockets that carry straw for the bands; sixteenth, in a novel method of combining a reciprocating receptacle with a stop-rake automatically operated by the conveyer, to regulate the discharge from the carrier to the conveyer.

The object of the next part of the invention is to deposit the bound sheaves in piles over the field; and the improvement consists, seventeenth, in a novel method of combining with a dumping-cradle oscillating on an axis parallel with the path of the machine, binder's stands, so arranged that the binders face the cradle; eighteenth, in a novel method of combining a reciprocating receptacle with a dumping-cradle, oscillating in a line parallel with the movement of the receptacle; nineteenth, in a novel method of combining a dumping-cradle and binder's stands with a receptacle reciprocating between the stands and cradle.

In the accompanying drawings all my improvements are shown as embodied in a machine of the class for which Letters Patent of the United States No. 73,788 were issued to me, January 28, 1868.

Figure 2:
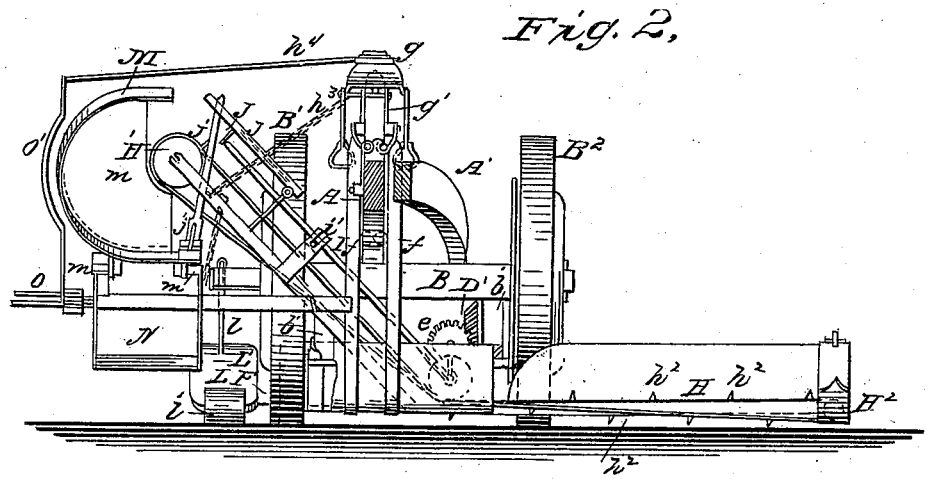
Figure 3:
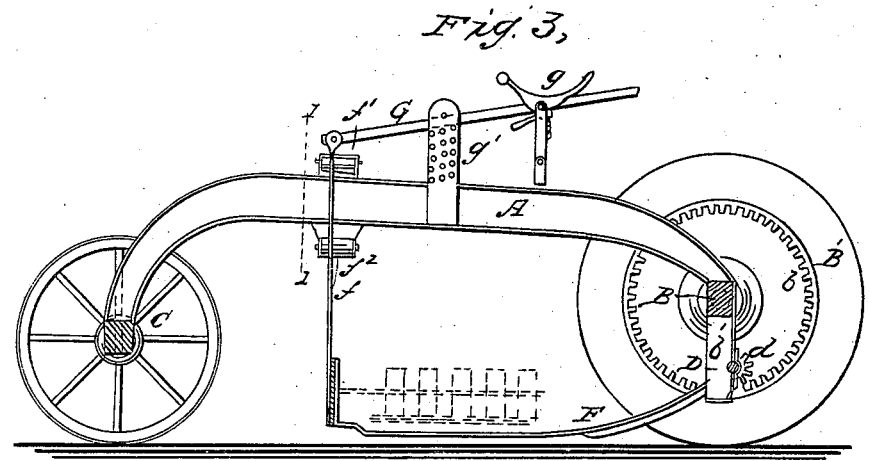
Figure 4:
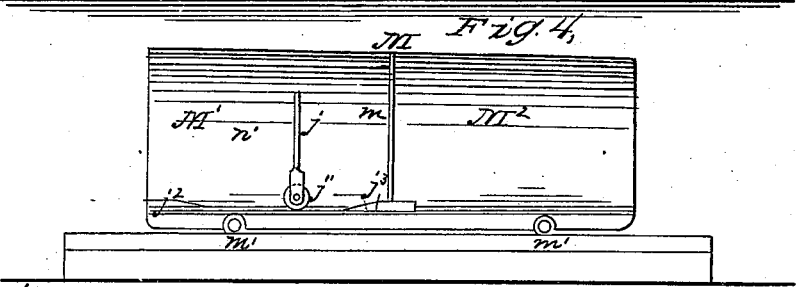

Figure 1 represents a plan or top view of my improved harvester; Fig. 2, a view in elevation of the same, as seen from the front, with the main frame in section at the line 1 1 of Fig. 3; Fig. 3, a vertical longitudinal section through the machine at the line 2 2 of Fig. 1; Fig. 4, a view in elevation of the reciprocating binding-receptacle, as seen from the inside.

In this instance the main frame is shown as consisting of two long arched beams, A A', pivoted in rear to the main axle B, and turning in front on a king-bolt on the axle of a leading truck, C. The driving-wheels $B^1$ $B^2$ turn loosely on the main axle, and carry internally-geared spur-wheels $b$, meshing into corresponding pinions $d$ on a counter-shaft, D, suspended in down-hangers $b'$ from the main axle. A bevel-wheel, D', on the counter-shaft drives a corresponding pinion, $e$, on a crank-shaft, E, which drives the cutters by a pitman, $e'$, in the usual way. A supplementary frame, F, is pivoted in rear to the brackets $b'$, and in front suspended from the main frame A by links $f$ straddling the beam A, and connected to a rocking-lever, G, pivoted on a post, $g'$, mounted on said beam. The driver rides on the saddle $g$, which is adjustable back and forth on the lever G, and thus counterpoises the preponderance of the weight of the machine in front of the axle B. Friction-rollers $f^1$ $f^2$ prevent the chafing of the straps against the beam A. By this device the driver also is enabled to raise or lower the cutting apparatus to conform to inequalities in the ground.

The machine is, of course, to be provided with the usual accessories of a fully organized harvester, such as a reel, cutting apparatus, divider, grain-wheel, &c.; but such devices are well known, and need no description here.

In order to carry out the first part of my invention, I arrange an endless apron, H, of canvas, or other flexible material, to traverse laterally behind the finger-beam to carry off the cut grain. This apron runs over rollers $H^1$ $H^2$, and is in this instance driven by a band from a pulley, $h$, on the crank-shaft, encircling a pulley, $h^1$, on the roller H'.

In order to give the necessary stiffness to the apron, I attach to it transversely strips of metal $h^2$, at regular intervals. The ends of these strips nearest the finger-bar are bent up to form hooks or studs $h^3$, which catch the butts of grain, and prevent their slipping on the apron, and carry them along parallel with the heads, thus insuring an even discharge. The cut grain is conveyed under a roller or rollers, E', in this instance mounted on the crank-shaft, and elevated over the roller H'.

In order to carry out the next part of my invention, I construct a grating, I, of slats, arranged parallel to each other over the elevating part of the apron. The lower ends of these slats are attached to the crank-shaft by straps $i$ passing between the rollers E'. The grating rocks in open bearings $i'$ near its center. In operation it bears lightly on the grain passing up on the apron, yields readily to accommodate masses of stalks, and permits the attendant to watch the grain in its passage to the binding-receptacle.

In order to carry out the next part of my invention, I mount a rake, J, on a rock-shaft, $j$, above the grating, and parallel with the conveyer. The teeth of this rake are bent down at their upper ends, and pressed against the conveyer whenever it is desired to stop the supply of grain to the binding-receptacle. When thus stopped the grain accumulates under the grating I.

In order to carry out the next part of the invention, the teeth of the stop-rake J are arranged to play vertically between the ribs of the grating I.

In order to carry out the next part of the invention, I pivot an arm, J', to the rake. A friction-roller, $j'$, on the lower end of this arm runs on a reciprocating receptacle K, hereinafter described, having cam planes $j^2 j^3$ on its surface to lift the stop-rake at suitable intervals.

In order to carry out the next part of the invention, binder's stands or foot-boards L L' are arranged in front and rear of the carrier H, which discharges the grain into the receptacle M, in a convenient position to be reached by the binders when standing upon their foot-boards.

In order to carry out the next part of my invention, I construct the binders' stands of a long board suspended at its rear end from the main axle B outside the driving-wheels by a strap, $l$, and sustained at its forward end by a projecting portion of the frame F. (See Fig. 2.) Both binders' stands, it will be observed, are thus brought in front of the driving-wheels.

In order to carry out the next part of my invention, I arrange the carrier H so as to pass below and be suspended from the arched beams A A' by the links $f$ and by chains $h^3$. This mode of construction allows the cutting apparatus, carrier, and binders' stands to be raised or lowered by the driver, or to rise to pass over inequalities of the ground, and yet prevents their dropping into dead furrows or other depressions. The binders' stands L L', it will be observed, are also suspended quite close to the ground.

In order to carry out the next part of my invention, I mount a small roller, $l'$, in suitable bearings in the front of the binders' foot-boards, so that in case a sudden rise in the ground is encountered the roller will lift the foot-boards over it without jolting the binders.

In order to carry out the next part of my invention, I arrange pockets N N' opposite each binder's stand and parallel with the path of the machine, so that the binders when working face the pockets, and can readily reach the bands or the straw from which to form the bands.

In order to carry out the next part of my invention, I arrange a receptacle, M, by preference of a semicircular form, opposite to the carrier H, and with its open side nearest the carrier. I also prefer to divide this receptacle into two compartments by a vertical partition, $m$. This receptacle is mounted on rollers $m'$, which run on ways $n$ above the pockets N. Each compartment of the receptacle is made about as long as the average length of the stalks to be bound, and is alternately supplied with grain by being shoved backward and forward on the ways $n$ by each binder in succession, which is easily done, as it runs very lightly on its rollers. The compartments also constitute the tables upon which the gavel is bound. As the receptacle is shoved backward the roller $j^1$ on the arm J' of the stop-rake lifts the rake, and the grain is discharged into the front compartment M'. As the receptacle is moved forward the roller rides over the cam-plane $j^3$, and the grain is discharged into the rear compartment. When the parts are in the position shown in Fig. 4, the rake rests on the carrier and the discharge is stopped. One attendant or binder binds while the other receptacle is being filled.

In order to carry out the next part of my invention, a dumping-cradle, O, is pivoted to rock on an axis parallel with the path of the machine. I prefer to pivot this cradle to the outer side of the pockets N N'. The binders can thus obtain their bands without reaching an inconvenient distance, and can readily deposit the bound gavel on the cradle as the receptacle moves out of the way, as heretofore explained. An arm, $o'$, fastened to the axle of the cradle, is held upright by a cord or chain, $h^4$, Fig. 2. When ready to drop the bundles the driver releases this cord, the cradle drops, and the bundles fall to the ground.

What I claim as my invention, and desire to secure by Letters Patent, is—

1. The combination, as set forth, with the flexible endless apron upon which the grain falls when first cut, of the transverse metal strips $h^2$, bent up into hooks at their front ends only to carry forward the butts of the grain, as described.

2. The combination, as set forth, with the elevating-conveyer, of the elastic oscillating grating, constructed, arranged, and operating as and for the purposes specified.

3. The combination, substantially as set forth, of a continuously-moving carrier with an oscillating stop-rake, to intermit the delivery of the grain to the binders.

4. The combination of a continuously-moving carrier, an elastic grating, and a stop-rake vibrating between the bars of the grating, substantially as specified.

5. The combination of a continuously-moving carrier with a stop-rake automatically and intermittently operated for the purpose specified.

6. The combination, as set forth, of the elevating-carrier with the binders' stands, so arranged both in front and rear thereof that the binders work with their faces toward the stubble.

7. The combination, as set forth, of the conveyer with the binders' stands, so arranged both in front and rear of the conveyer and of the driving-wheels that the binders work with their faces toward the stubble.

8. The combination, substantially as set forth, of an elevated frame and a conveyer suspended below said frame, with binders' stands also suspended below said frame on each side of the conveyer.

9. The combination of a supporting-roller with a binders foot-board, flexibly suspended from the main frame, substantially in the manner described.

10. The combination, substantially as set forth, with the binders' stands, of the pockets, to carry the bands.

11. The combination, substantially as set forth, with binders' stands, of a reciprocating receptacle.

12. The combination, substantially as set forth, of a conveyer discharging the grain laterally to the path of the machine of a receptacle reciprocating transversely to the conveyer.

13. The combination, substantially as set forth, with the receptacle which delivers a gavel to each binder in succession, of the binders' stands, located in front and rear of the conveyer, and on the grain side of the receptacle.

14. The combination, substantially as set forth, of the binders' stand, with a reciprocating binding-table.

15. The arrangement of a receptacle to traverse over the pockets for the bands, substantially in the manner described.

16. The combination, substantially as set forth, of an intermittently-reciprocating receptacle and a stop-rake automatically operated by the receptacle to intermit the discharge from the conveyer into the receptacle.

17. The combination, with binders' stands, of a dumping-cradle oscillating on an axis parallel to the path of the machine, with the binders' stand so arranged that the binders face the cradle.

18. The combination, substantially as set forth, of a reciprocating receptacle with a dumping-cradle, oscillating on an axis parallel with the line of movement of the conveyer.

19. The combination, substantially as set forth, of a dumping-cradle and binders' stands, with a receptacle reciprocating between the stands and cradle.

In testimony whereof I have hereunto subscribed my name.

EZRA EMMERT.

Witnesses:
AARON L. PORTER,
EDWIN W. HINE.